United States Patent [19]
Amano et al.

[11] Patent Number: 5,939,200
[45] Date of Patent: *Aug. 17, 1999

[54] INSULATING FILM FOR USE IN MOTOR OF REFRIGERATION COMPRESSOR

[75] Inventors: Satoshi Amano; Tomoki Nakamura; Takahiko Ito, all of Tokyo, Japan

[73] Assignee: Nisshinbo Industries, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/720,450

[22] Filed: Sep. 30, 1996

[30] Foreign Application Priority Data

Oct. 3, 1995 [JP] Japan ............................. 7-282647

[51] Int. Cl.$^6$ .................................................. C08G 18/02
[52] U.S. Cl. ........................... 428/423.1; 310/45; 310/88; 62/468; 62/469
[58] Field of Search .................. 528/44; 525/440; 428/423.1; 310/45, 88; 62/468, 469

[56] References Cited

U.S. PATENT DOCUMENTS

| | | | |
|---|---|---|---|
| 3,835,098 | 9/1974 | Brown et al. | 260/75 |
| 4,071,503 | 1/1978 | Thomas et al. | 264/98 |
| 4,077,989 | 3/1978 | Schäfer et al. | 560/158 |
| 4,128,599 | 12/1978 | Thomas et al. | 525/424 |
| 5,066,705 | 11/1991 | Wickert | 524/457 |
| 5,416,184 | 5/1995 | Amano | 528/44 |
| 5,711,165 | 1/1998 | Iizuka et al. | 62/474 |

FOREIGN PATENT DOCUMENTS

| | | |
|---|---|---|
| 0 451 707 A2 | 10/1991 | European Pat. Off. |
| 0 485 979 A2 | 5/1992 | European Pat. Off. |
| 0 738 749 A1 | 10/1996 | European Pat. Off. |
| WO 95/20012 | 7/1995 | WIPO |

OTHER PUBLICATIONS

Database WPI, Week 9348, Derwent Publ. Ltd., AN 93–383134, XP–002022456, Abstract of Japanese Patent Publication No. 05 287 067 A, Publication Date: Nov. 02, 1993.

Database WPI, Week 9334, Derwent Publ. Ltd., AN 93–269886, XP–002022461, Abstract of Japanese Patent Publication No. 05 186 615 A, Publication Date: Jul. 27, 1993.

Database WPI, Week 9245, Derwent Publ. Ltd., AN 92–368592, XP–002022457, Abstract of Japanese Patent Publication No. 04 268 343 A, Publication Date: Sep. 24, 1992.

*Primary Examiner*—Rachel Gorr
*Attorney, Agent, or Firm*—Kubovcik & Kubvcik

[57] ABSTRACT

The present invention provides an insulating film for use in the motor of a refrigeration compressor using a substitute flon and a refrigerating machine oil in particular combination, which film is obtained by adding to a base film, or coating on the surface of a base film, a compound having at least one carbodiimide group, or, which film is made essentially of a compound having at least one carbodiimide group, represented by the following formula (1):

$$-\!\!\!+\!\!N\!\!=\!\!C\!\!=\!\!N\!\!-\!\!R_1\!\!\xrightarrow{}_{\overline{n1}} \quad (1)$$

or the following formula (2):

$$R_3-\!\!R_2\!\!+\!\!N\!\!=\!\!C\!\!=\!\!N\!\!-\!\!R_2\!\!\xrightarrow{}_{\overline{n2}}\!\!R_4 \quad (2)$$

or the following formula (3):

$$-\!\!\!+\!\!N\!\!=\!\!C\!\!=\!\!N\!\!-\!\!R_5\!\!\xrightarrow{}_{\overline{n3}}\!\!(Y\!\!-\!\!R_6\!\!\xrightarrow{}_{\overline{m}} \quad (3)$$

or the following formula (4):

$$R_8\!\!+\!\!N\!\!=\!\!C\!\!=\!\!N\!\!-\!\!R_7\!\!\xrightarrow{}_{\overline{n4}}\!\!N\!\!=\!\!C\!\!=\!\!N\!\!-\!\!R_9 \quad (4)$$

This insulating film can eliminate the problems of the prior art, has excellent resistance to hydrolysis and forms no sludge, resultantly can prevent reduction in insulating property, and further has deterioration resistance to refrigerating machine oil.

4 Claims, No Drawings

INSULATING FILM FOR USE IN MOTOR OF REFRIGERATION COMPRESSOR

BACKGROUND OF THE INVENTION (1) Field of the Invention

The present invention relates to an insulating film for use in motor of refrigeration compressor. More particularly, the present invention relates to an insulating film for use in motor of refrigeration compressor, which has excellent resistances to the substitute flon and refrigerating machine oil (e.g. synthetic lubricating oil) used in particular combination in the refrigeration compressor and moreover imparts deterioration resistance to the refrigerating machine oil.

(2) Description of the Prior Art

Flon gases, which have been used as a refrigerant for air conditioner or refrigerating machine, are believed to be a cause for ozone layer destruction and global warming, and the use of particular flons having a high ozone depletion potential, such as R11 ($CCl_3F$), R12 ($CCl_2F_2$) and the like must be totally banned by 2,000 according to the decision made at the Copenhagen Agreement in November 1992, amended in the Montreal Protocol. In this connection, change of flon gases to substitute flons such as hydrofluorocarbons (HFC), hydrochlorofluoro-carbons (HCFC) and the like is taking place. Of the substitute flons, R134a ($CH_2F$—$CF_3$) is drawing high attention and is coming to be used practically.

R134a, however, is not compatible with mineral oils which have been used as a lubricating oil for refrigeration compressor. Hence, synthetic oils of polyoxyalkylene glycol type, ester-modified polyoxyalkylene glycol type, ester type or the like are coming to be used as a new lubricating oil for refrigeration compressor.

The motor of air conditioner or refrigerating machine is used as a motor of compressor for refrigerant and is constantly placed in an atmosphere where the above-mentioned refrigerant and lubricating oil coexist. Therefore, when the compressor is in operation, the coil of the motor comes in contact with a gaseous refrigerant of high temperature and high pressure, a lubricating oil containing a large amount of the refrigerant dissolved therein, etc.; when the compressor is in stop, a liquid-state refrigerant is accumulated inside the compressor. Thus, the insulating film used for insulation of the above motor is exposed to such conditions over a long period of time and yet is required to have a semi-permanent life.

As such an insulating film, there has been widely used a polyethylene terephthalate (hereinafter abbreviated to PET) film for its balanced properties in heat resistance, solvent resistance, electrical insulation, mechanical strengths, etc. The PET film, however, is liable to hydrolysis by the water present in refrigerating machine oil of polyalkylene glycol type, ester-modified polyalkylene glycol type, ester type or the like, and has inevitably shown significant reduction in mechanical strengths and electrical insulation.

Also in the PET film, the low-molecular materials, etc. contained therein are extracted by the above-mentioned synthetic lubricating oil having a higher solvency for organic substances than mineral oils have, resulting in sludge formation and film embrittlement; thus, there has been a fear of reduction in compressor life.

Recently, as the output of compressor has become larger, the heat resistance and pressure resistance requirements for the insulating film of compressor motor have also become larger. In this connection, study on use of polyimide film, polyamideimide film or the like is under way. These films, however, are not satisfactory because they cause hydrolysis by the water contained in the refrigerating machine oil used in combination with a substitute flon and thereby generate organic acids, which may invite deterioration of the refrigerating machine oil and resultant reduction in refrigerating capacity.

OBJECT AND SUMMARY OF THE INVENTION

In view of the above situation, the object of the present invention is to provide an insulating film for use in motor of refrigeration compressor, which has excellent hydrolysis resistance, generates no sludge, resultantly prevents reduction in insulation, and further has a deterioration resistance to refrigerating machine oil.

In order to solve the above-mentioned problems of the prior art, the present inventors made a study. As a result, the present inventors found out that the above object can be achieved by using, as an insulating film, a carbodiimide film obtained by adding, to a base film, a particular compound having at least one carbodiimide group in the molecule, or by coating the particular compound on the base film, or by using essentially the particular compound. The finding has led to the completion of the present invention.

According to the present invention, there is provided an insulating film for use in the motor of a refrigeration compressor using a substitute flon and a refrigerating machine oil in particular combination, which film is obtained by adding, to a base film, a compound having at least one carbodiimide group, represented by the following formula (1)

  (1)

(wherein $R_1$, is an isocyanate residue, and $n_1$ is an integer of 1 or more), or the formula (2)

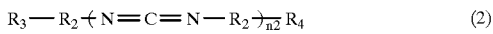  (2)

(wherein $R_2$ is an isocyanate residue; $R_3$ and $R_4$ are each a terminal group; and $n_2$ is an integer of 1 or more), or the formula (3)

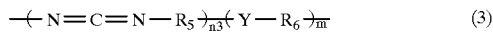  (3)

(wherein $R_5$ and $R_6$ are each an isocyanate residue; Y is a residue of a compound having a functional group reactive with isocyanate; and $n_3$ and m are each an integer of 1 or more), or the formula (4)

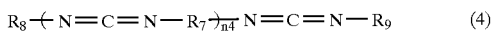  (4)

(wherein $R_7$ is an isocyanate residue; $R_8$ and $R_9$ are each a terminal group; and $n_4$ is an integer of 1 or more).

According to the present invention, there is also provided an insulating film for use in the motor of a refrigeration compressor using a substitute flon and a refrigerating machine oil in particular combination, which film is obtained by coating, on the surface of a base film, a compound having at least one carbodiimide group, represented by the above formula (1) or the formula (2) or the formula (3) or the formula (4).

According to the present invention, there is further provided an insulating film for use in the motor of a refrigeration compressor using a substitute flon and a refrigerating machine oil in particular combination, which film is made essentially of a compound having at least one carbodiimide group, represented by the above formula (1) or the formula (2) or the formula (3) or the formula (4).

DETAILED DESCRIPTION OF THE INVENTION

The present invention is hereinafter described in detail.

In the present invention, "insulating film for use in motor of refrigeration compressor" refers to, for example, a film used in a motor of refrigeration compressor which has a first winding and a second winding, in the form of layer insulation, slot insulation, slot wedge or the like to separate the windings from each other for prevention of their contact.

In the present invention, the insulting film for use in motor of refrigeration compressor is obtained by adding to a base film, or coating on the surface of a base film, a compound having at least one carbodiimide group, or, is made essentially of a compound having at least one carbodiimide group (the compound is hereinafter abbreviated to "carbodiimide compound" in some cases).

The compound having at least one carbodiimide group, used in the present invention includes group (I) compounds represented by the following formula (1):

(1)

(wherein $R_1$ is an isocyanate residue, and $n_1$ is an integer of 1 or more); group (II) compounds represented by the following formula (2):

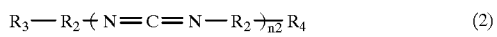
(2)

(wherein $R_2$ is an isocyanate residue; $R_3$ and $R_4$ are each a terminal group; and $n_2$ is an integer of 1 or more); group (III) compounds represented by the following formula (3):

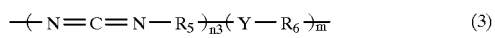
(3)

(wherein $R_5$ and $R_6$ are each an isocyanate residue; Y is a residue of a compound having a functional group reactive with isocyanate; and $n_3$ and m are each an integer of 1 or more); and group (IV) compounds represented by the following formula (4):

(4)

(wherein $R_7$ is an isocyanate residue; $R_8$ and $R_9$ are each a terminal group; and n4 is an integer of 1 or more).

In the formula (1) of the group (I) compounds, $R_1$ can be exemplified by the following groups:

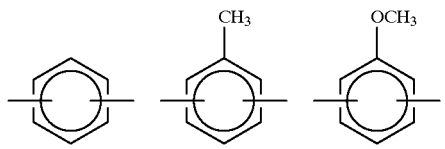

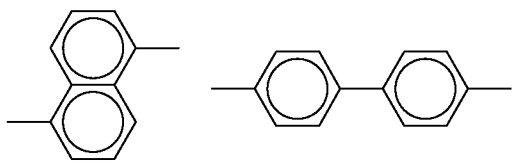

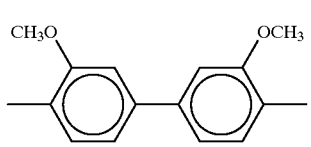

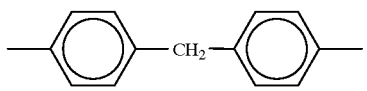

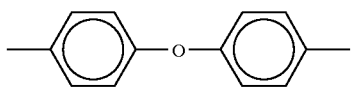

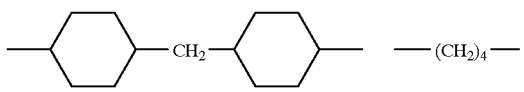

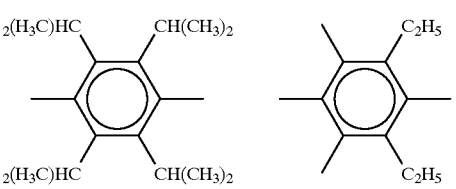

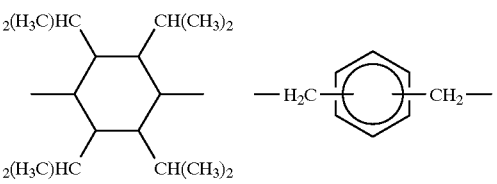

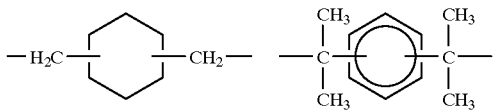

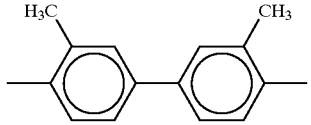

In the formula (1) of the group (I) compounds, $n_1$ is an integer of 1 or more. The formula (1) indicates a state in which polymerization has proceeded sufficiently. When polymerization has not proceeded sufficiently, the group (I)

compounds are represented more appropriately by the following formula:

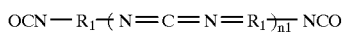

(wherein $R_1$s may be the same or different). This applies also to the formula (3) of the group (III) compounds described later.

In the formula (2) of the group (II) compounds, $R_3$ and $R_4$ are each a terminal group by a residue of a compound having a functional group such as —$NH_2$, —NHX, —COOH, —SH, —OH or —NCO, or the following structures:

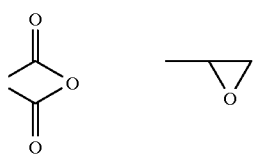

In the formula (2) of the group (II) compounds, $n_2$ is an integer of 1 or more; and $R_2$ can be exemplified by the same groups as mentioned with respect to $R_1$ in the formula (1) of the group (I) compounds.

In the formula (3) of the group (III) compounds, Y is a residue of a compound having a functional group reactive with isocyanate, and can be exemplified by the following structures:

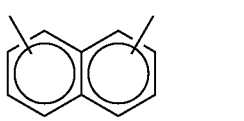

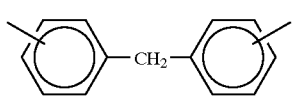

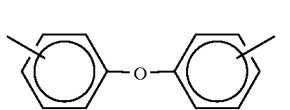

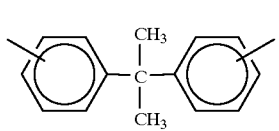

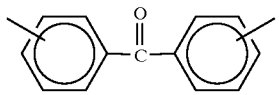

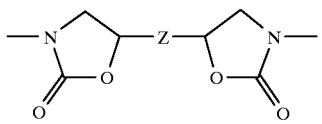

[wherein Z is an alkylene group, a bivalent cycloalkyl group, a bivalent cycloalkyl group having a substituent(s), a bivalent aryl group, a bivalent aryl group having a substituent (s), one of the following groups:

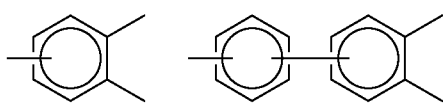

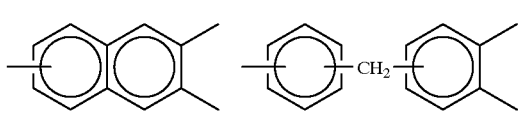

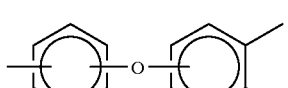

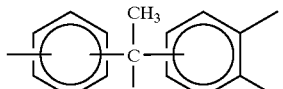

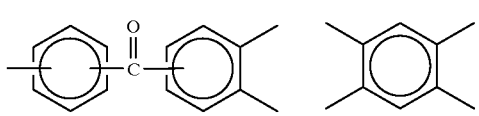

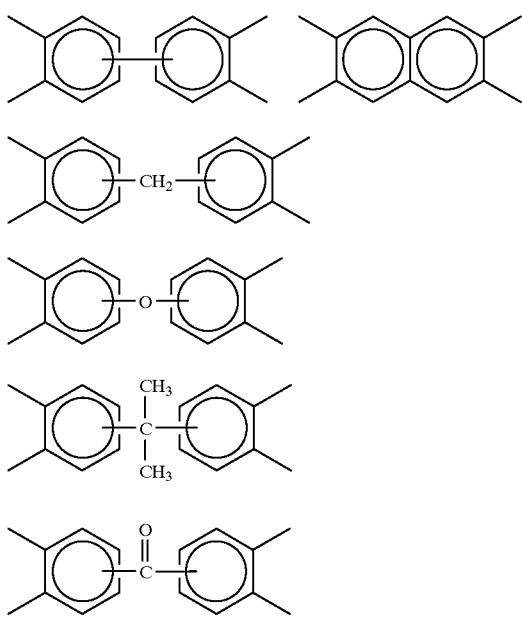

or a group wherein one of the above structures has a substituent(s) such as lower alkyl group, lower alkoxy group or the like].

Therefore, the group (III) compounds represented by the formula (3) are carbodiimide copolymers. In the formula (3) of the group (III) compounds, $n_3$ and m are each an integer of 1 or more; $R_5$ can be the same group as mentioned with respect to $R_1$ in the formula (1) of the group (I) compounds; and R6 can be the same group as mentioned with respect to $R_1$ in the formula (1) of the group (I) compounds, or the same group as mentioned with respect to bivalent Z in the formula (3) of the group (III) compounds.

In the formula (4) of the group (IV) compounds, $R_8$ nd $R_9$ can each be exemplified by isocyanate residues such as shown below:

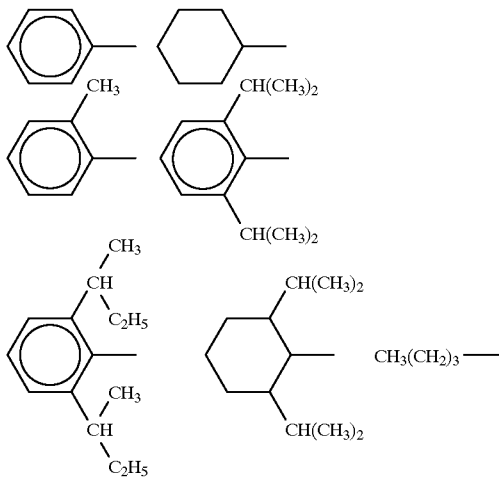

Incidentally, $R_8$ and $R_9$ may be the same or different.

A group (IV) compound of the formula (4) wherein $n_4$ is 0, can be obtained by reacting two monoisocyanates each having the above-mentioned isocyanate residue.

The present insulating film for use in motor of refrigeration compressor can be obtained by, as mentioned above, adding the above-mentioned carbodiimide compound to a base film heretofore used as an insulating film for motor of refrigeration compressor, or by coating the carbodiimide compound on the base film, or by making an insulating film essentially with the carbodiimide compound.

When the carbodiimide compound is added to a base film heretofore used as an insulating film for motor of refrigeration compressor, the amount of the carbodiimide compound added is, for example, 0.05–50 parts by weight, preferably 0.1–30 parts by weight per 100 parts by weight of the base film. When the amount is less than the above lower limit, no intended effect is obtained. When the amount is more than the above upper limit, increase in effect is not so high as expected and, in some cases, gives a film of impaired properties.

The base film can be a known film such as polyester film, polyimide film, polyamideimide film, polyetherimide film, aromatic polyamide film, polyhydantoin film, polyparabanic acid film, polyethersulfone film or the like.

The method of adding the carbodiimide compound to the base film may be a known method. When the base film is, for example, a thermoplastic film, the method includes, for example, (1) a method of adding a carbodiimide compound in production of resin pellets which is a raw material of base film, and (2) a method of adding a carbodiimide compound to a film produced by casting or to a material to be casted.

When the carbodiimide compound is coated on the base film, the compound is preferably a film-formable compound selected from the group (I) compounds, the group (II) compounds, the group (III) compounds and the group (IV) compounds. Preferred are group (I) compounds wherein $n_1 \geq 20$; group (II) compounds wherein $n_2 \geq 30$; group (III) compounds wherein $n_3 \geq 20$ and $m \geq 1$, or $n_3 \geq 1$ and $m \geq 15$; and group (IV) compounds wherein $n_4 \geq 20$.

The method used for coating the carbodiimide compound on the base film can be a known method. There can be used, for example, a method which comprises dissolving a carbodiimide compound having at least one carbodiimide group, in a solvent to prepare a solution, immersing a base insulating film in the solution or coating the solution on the film, subjecting the resulting material to solvent removal, and heat-treating the solvent-removed material. The thickness of the carbodiimide compound layer formed on the base film is 1–50 μm, preferably 5–20 μm. When the thickness is less than 1 μm, no intended effect is obtained. When the thickness is more than 50 μm, increase in effect is not so high as expected and, in some cases, gives a film of impaired properties.

When the thickness can be more than 50 μm, the present insulating film can be made with a group (I), or group (II) or group (III) compound alone.

The method used for making an insulating film essentially with the carbodiimide compound can also be a known method. There can be used, for example, a method which comprises casting a solution containing the carbodiimide compound, and forming the carbodiimide compound powder under pressure and heating.

The present invention is hereinafter described by way of Examples and Test Example. However, the present invention is not restricted thereto.

In the Examples, the following compounds 1–5 each having a carbodiimide group(s) were used. Incidentally, the expression n=∞ used in the compounds 1, 4 and 5 indicates that the terminal functional groups are not detected by FT-IR analysis and are substantially absent and the compounds are high-molecular compounds.

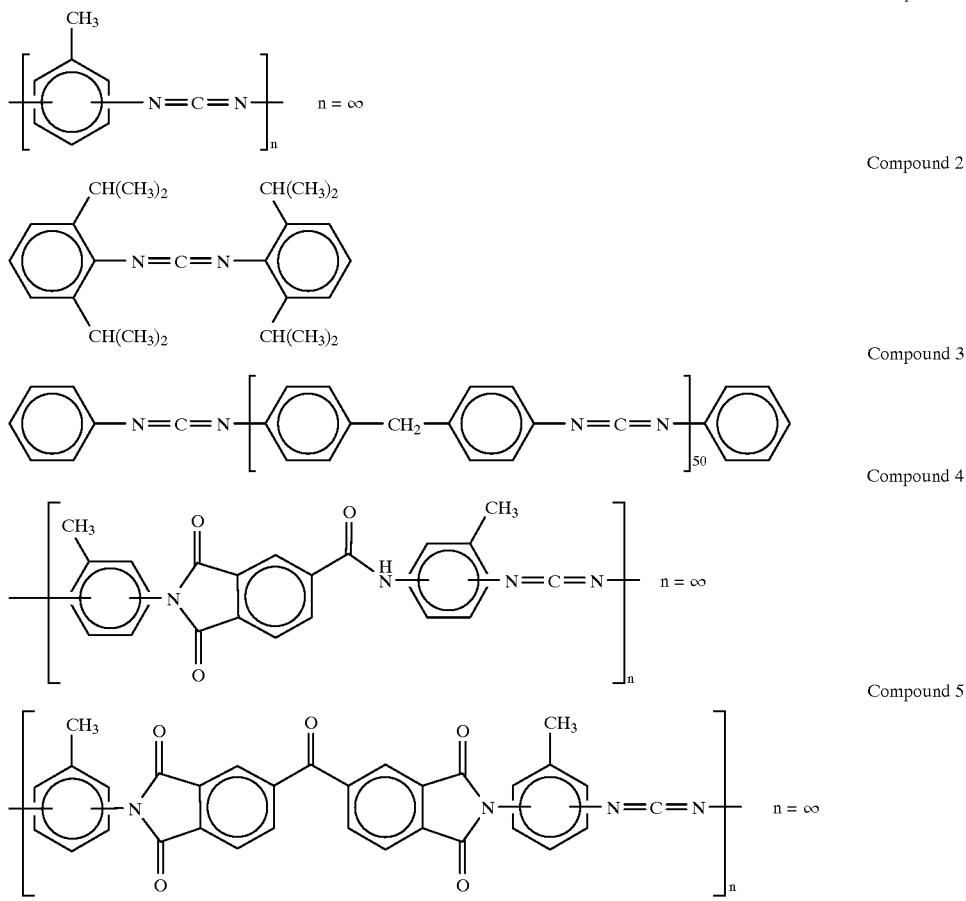

Compound 1

Compound 2

Compound 3

Compound 4

Compound 5

EXAMPLE 1

100 parts by weight of commercial polyethylene terephthalate pellets for film making and 8 parts by weight of the compound 2 were dry-blended. The blend was placed in a hopper and fed into an extruder to knead the blend at 240–270° C. The kneaded material was extruded from the extruder T die with stretching being applied, to prepare an intended film (1) having a thickness of 100 μm.

EXAMPLE 2

54.0 g of 80-TDI (a 80/20 mixture of 2,4-tolylene diisocyanate and 2,6-tolylene diisocyanate) was reacted at 120° C. for 4 hours in the presence of 0.11 g of a carbodiimidization catalyst (1-phenyl-3-methyl-2-phospholene-1-oxide) in 500 ml of tetrachloroethylene to obtain a solution of a polycarbodiimide having a structure of compound 1, which showed no absorption of isocyanate group by infrared absorption analysis (hereinafter abbreviated to IR). The solution was subjected to film formation by casting, to obtain a polycarbodiimide film (2) having a thickness of 80 μm.

EXAMPLE 3

A commercial polyethylene terephthalate film having a thickness of 50 μm was immersed in the polycarbodiimide solution of Example 2 to prepare an intended film (3) having a thickness of 80 μm, which is a polyethylene terephthalate film having, on each side, a compound 1 layer having a thickness of about 15 μm.

EXAMPLE 4

A commercial polyamideimide powder was dissolved in N-methyl-2-pyrrolidone to obtain a solution containing 20% by weight of the polyamideimide powder. To 100 parts by weight of this polyamideimide solution was added 7 parts by weight of an N-methyl-2-pyrrolidone solution containing 20% by weight of the compound 4, to prepare a varnish. The varnish was subjected to film formation by casting, followed by solvent removal and annealing, to prepare an intended film (4) having a thickness of 80 μm, having amide group, imide group and carbodiimide group.

EXAMPLE 5

17.4 g of 80-TDI was reacted with 16.1 g of benzophenonetetracarboxylic acid anhydride in 300 ml of nitrobenzene at 150° C. for 4 hours. Thereto was added 200 ml of N-methyl-2-pyrrolidone and 0.02 g of a carbodiimidization catalyst, and a reaction was conducted at 150° C. for 20 hours to obtain a solution of a polycarbodiimide having a structure of compound 5, which showed no absorption of isocyanate group by IR. The solution was subjected to film formation by casting, followed by solvent removal, to obtain an intended polycarbodiimide film (5) having a thickness of 80 μm.

EXAMPLE 6

57.8 g of p-MDI (pure diphenylmethane diisocyanate) was reacted with 1.1 g of phenyl isocyanate in the presence of 0.12 g of a carbodiimidization catalyst (1-phenyl-3-methyl-2-phospholene-1-oxide) in 500 ml of tetrahydrofuran at 65° C. for 20 hours, to obtain a solution of a polycarbodiimide having a structure of compound 3, which showed no absorption of isocyanate group by IR. The solution was subjected to film formation by casting, to obtain a polycarbodiimide film (6) having a thickness of 80 μm.

EXAMPLE 7

The polycarbodiimide film having a structure of compound 1, obtained in Example 2 was treated at 200° C. for 5 minutes to obtain an intended polycarbodiimide film (7) wherein part of the carbodiimide groups was dimerized to form a crosslinked structure.

Test Example 50 ml of a commercial ester type oil was placed in a 100-ml autoclave. In the autoclave were also placed three rectangular (3 cm×6 cm) test pieces prepared by cutting one of the films prepared in Examples 1–7, so that the test pieces were immersed in the oil. Then, the autoclave was tightly sealed, heated at 175° C. for 10 days, and then opened. Thereafter, (1) the total oxidation numbers of the oil before and after the heating and (2) the tensile strengths of the film before and after the heating were measured. The results are shown in Table 1.

COMPARATIVE EXAMPLE 1

50 ml of a commercial ester type oil and a commercial polyethylene terephthalate film having a thickness of 80 μm were heated in an autoclave in the same manner as in Test Example. Then, (1) the total oxidation numbers of the oil before and after the heating and (2) the tensile strengths of the film before and after the heating were measured in the same manner as in Test Example. The results are shown in Table 1.

COMPARATIVE EXAMPLE 2

50 ml of a commercial ester type oil alone was heated in an autoclave in the same manner as in Test Example. Then, the total oxidation numbers of the oil before and after the heating were measured. The results are shown in Table 1.

TABLE 1

| | Total Oxidation Numbers of Oil (mg KOH/g) | | Tensile Strength of Film (kfg/mm²) | |
|---|---|---|---|---|
| | Before Heating | After Heating | Before Heating | After Heating |
| Film 1 | 0.02 | 0.25 | 15.4 | 9.8 |
| Film 2 | 0.02 | 0.18 | 17.9 | 14.5 |
| Film 3 | 0.02 | 0.15 | 14.8 | 11.0 |
| Film 4 | 0.02 | 0.21 | 13.4 | 11.7 |
| Film 5 | 0.02 | 0.20 | 14.1 | 12.6 |
| Film 6 | 0.02 | 0.17 | 13.3 | 10.2 |
| Film 7 | 0.02 | 0.19 | 15.9 | 13.6 |
| Comparative Example 1 | 0.02 | 0.35 | 16.2 | Unable to Measure* |
| Comparative Example 2 | 0.02 | 0.33 | — | — |

*Test pieces deteriorated and became brittle, and could not be fitted to a tensile strength tester.

The present insulating film for use in motor of refrigeration compressor, comprising a polycarbodiimide, as compared with conventional insulating films, has higher resistances to refrigerating machine oil and refrigerant and can prevent deterioration of insulation.

Further, with the present insulating film for use in motor of refrigeration compressor, the carbodiimide groups possessed by the polycarbodiimide of the film can capture (a) the acid components (e.g. carboxylic acids and phosphoric acid) generated by the decomposition of refrigerating machine oil, refrigerant and additives and (b) water which causes the hydrolysis of ester bond of refrigerating machine oil, and thereby can prevent oxidation number increase in refrigeration compressor system.

What is claimed is:

1. A motor useful for a refrigeration compressor comprising a plurality of windings and an insulating film separating windings, where said film is obtained by coating a surface of a base film with a compound containing at least one carbodiimide group, represented by the following formula (1)

wherein $R_1$ is an isocyanate residue, and n is an integer of 1 or more, or the formula (2)

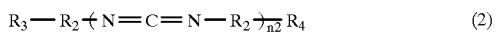

wherein $R_2$ is an isocyanate residue; $R_3$ and $R_4$ are each a terminal group; and $n_2$ is an integer of 1 or more, or the formula (3)

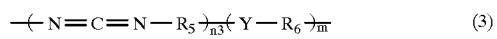

wherein $R_5$ and $R_6$ are each an isocyanate residue; Y is a residue of a compound having a functional group reactive with isocyanate; and $n_3$ and m are each an integer of 1 or more, or the formula (4)

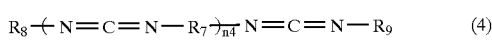

wherein $R_7$ is an isocyanate residue; $R_8$ and $R_9$ are each a terminal group; and $n_4$ is an integer of 1 or more.

2. In a refrigeration unit including a refrigeration compressor, a motor for driving said compressor, said motor including an insulation film and windings, and a lubricating oil, the improvement comprising using as the insulation film a film obtained by coating a surface of a base film with a compound containing at least one carbodiimide group, represented by the following formula (1)

wherein $R_1$ is an isocyanate residue, and $n_1$ is an integer of 1 or more, or the formula (2)

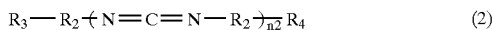

wherein $R_2$ is an isocyanate residue; $R_3$ and $R_4$ are each a terminal group; and $n_2$ is an integer of 1 or more, or the formula (3)

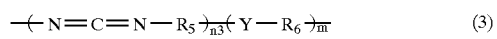

wherein $R_5$ and $R_6$ are each an isocyanate residue; Y is a residue of a compound having a functional group reactive with isocyanate; and $n_3$ and m are each an integer of 1 or more or, or the formula (4)

wherein $R_7$ is an isocyanate residue; $R_8$ and $R_9$ are each a terminal group; and $n_4$ is an integer of 1 or more.

3. The motor of claim 4, wherein said base film is selected from the group consisting of polyester film, polyamide film, polyamideimide film, polyetherimide film, aromatic polyamide film, polyhydantoin film, polyparabanic acid film and polyethersulfone film.

4. The refrigeration unit of claim 2, wherein said base film is selected from the group consisting of polyester film, polyamide film, polyamideimide film, polyetherimide film, aromatic polyamide film, polyhydantoin film, polyparabanic acid film and polyethersulfone film.

\* \* \* \* \*